United States Patent
Adler

(10) Patent No.: US 6,537,052 B1
(45) Date of Patent: Mar. 25, 2003

(54) METHOD AND APPARATUS FOR HIGH SPEED ELECTRON BEAM RAPID PROTOTYPING

(76) Inventor: Richard J. Adler, 4421 McLeod Rd., NE, Suite A, Albuquerque, NM (US) 87109

(*) Notice: Subject to any disclaimer, the term of this patent is extended or adjusted under 35 U.S.C. 154(b) by 0 days.

(21) Appl. No.: 09/379,224

(22) Filed: Aug. 23, 1999

(51) Int. Cl.⁷ .............................................. B29C 35/08
(52) U.S. Cl. .................... 425/174.4; 264/308; 264/401; 264/485
(58) Field of Search .......................... 425/174.4, 174; 264/308, 401, 485

(56) References Cited

U.S. PATENT DOCUMENTS

| | | | |
|---|---|---|---|
| 4,117,339 A | * 9/1978 | Wolf | 250/492 A |
| 4,323,756 A | 4/1982 | Brown et al. | |
| 4,477,729 A | 10/1984 | Chang et al. | |
| 4,575,330 A | * 3/1986 | Hull | 425/174.4 |
| 4,835,399 A | * 5/1989 | Hosaka et al. | 250/492.2 |
| 4,868,395 A | * 9/1989 | Kasahara et al. | 250/398 |
| 4,894,549 A | * 1/1990 | Stengl | 250/492.2 |
| 4,929,402 A | 5/1990 | Hull | |
| 5,024,969 A | 6/1991 | Reche | |
| 5,319,198 A | * 6/1994 | Wada | 250/310 |
| 5,609,814 A | * 3/1997 | Takano | 264/401 |
| 5,753,171 A | * 5/1998 | Serbin et al. | 264/401 |
| 5,876,550 A | 3/1999 | Feygin et al. | |
| 5,902,537 A | 5/1999 | Almquist et al. | |
| 6,107,008 A | * 8/2000 | Howell et al. | 430/328 |

FOREIGN PATENT DOCUMENTS

| | | | |
|---|---|---|---|
| EP | 0150089 A1 | * | 7/1985 |
| JP | 401043961 A | * | 2/1989 |

OTHER PUBLICATIONS

Hewitt, Paul G., Conceptual Physics, 1987, Addison–Wesley Publishing Company, Inc., p. 513, 520.*

* cited by examiner

Primary Examiner—Jan H. Silbaugh
Assistant Examiner—Emmanuel Luk
(74) Attorney, Agent, or Firm—Dennis F. Armijo

(57) ABSTRACT

An electron beam as a curing technique with dynamic beam control technology in order to produce arbitrarily shaped parts. The result of this is equipment which can create prototypes and parts rapidly without additional tooling. The electron beam from a low divergence gun is accelerated towards uncured monomer in vacuum. Deflection of the beam combined with a grid which is used to turn the beam on and off, creates a two dimensional curing path with a depth of approximately five (5) thousandths of inch. Successive layers of this type, built up as monomer is added, creates a three dimensional pattern. The layers can either be of uniform thickness, or can be varied in thickness by varying the energy of the beam.

13 Claims, 3 Drawing Sheets

METHOD AND APPARATUS FOR HIGH SPEED ELECTRON BEAM RAPID PROTOTYPING

BACKGROUND OF THE INVENTION

1. Field of the Invention (Technical Field)

The invention relates to manufacturing three dimensional objects, and more particularly to an apparatus and method of forming three dimensional objects from a fluid medium using a high speed electron beam to harden the fluid medium in a predetermined pattern.

2. Background Art

Rapid prototyping is the technology of creating arbitrarily shaped parts. In general, this technology has the ability to produce enclosed volumes (like a can) in contrast to such processes as multi-axis milling which can only produce simply connected volumes (like a cup instead of a can, which is simply connected to the outside of the cup). If this technology is fast and accurate enough it can replace a variety of other techniques such as molding, and in many cases eliminate bonding of multiple pieces of material.

Present rapid prototyping technologies, as disclosed in U.S. Pat. No. 4,575,330 to Hull and U.S. Pat. No. 4,929,402 to Hull, use lasers or powder streams at high cost, and with slow processing rates. The processing rate of the most commonly used machines produces a ¼ scale cylinder head of size of order <1000 cubic cm in 4.5 hours. Such a part will cost in excess of $1000. By using the present invention, the cost level is comparable to other types of machining.

Laser-based rapid prototyping works by using a laser to cure a liquid. The laser's position on the liquid is moved by mirrors, and limited by a fundamentally low cure rate, and by the rate at which the laser mirrors can be moved. The reasons for the low cure rate are low laser power (a typical existing machine has 1 W of laser power) and the relatively low rates of conversion of laser photons to curing power. Other variants use technology analogous to ink jet printing yielding parts which are produced somewhat faster, but with inferior mechanical properties. All existing techniques are limited in their speed to speeds too low for parts' production.

SUMMARY OF THE INVENTION (DISCLOSURE OF THE INVENTION)

In accordance with the present invention, there is provided an apparatus and method for creating an arbitrarily shaped part. The preferred apparatus of the invention is a rapid prototyping/manufacturing apparatus comprising at least one electron beam, a means to focus said at least one electron beam, a means to electromagnetically steer said focused at least one electron beam onto a substance to be solidified and a control means to control said at least one electron beam and said means to electromagnetically steer said focused at least one electron beam.

The preferred method for creating an arbitrarily shaped part comprises the steps of providing at least one electron beam, focusing the at least one electron beam onto the substance to be solidified, steering the at least one electron beam electromagnetically and controlling the at least one electron beam and the electromagnetic steering apparatus.

The primary object of the present invention is to create arbitrarily shaped plastic parts rapidly directly from a computer generated image.

Another object of the present invention is to process parts without the use of heat which distorts shapes as in molten plastic systems.

Yet another object of the invention is to create parts with such great rapidity that it can be used economically for production runs of parts.

The primary advantage of the present invention is it's potential for high speed resulting from the intrinsic properties of electron beams. This reduces cost and makes possible the creation of production runs of complex parts.

Another advantage of the present invention is to overcome inertial effects in the control system which are associated with competing systems which rely on physical motion such as moving table systems, and moving mirror systems.

Yet another advantage of the invention is that it has the unique ability to vary the depth of plastic solidification unlike other methods of rapid prototyping.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
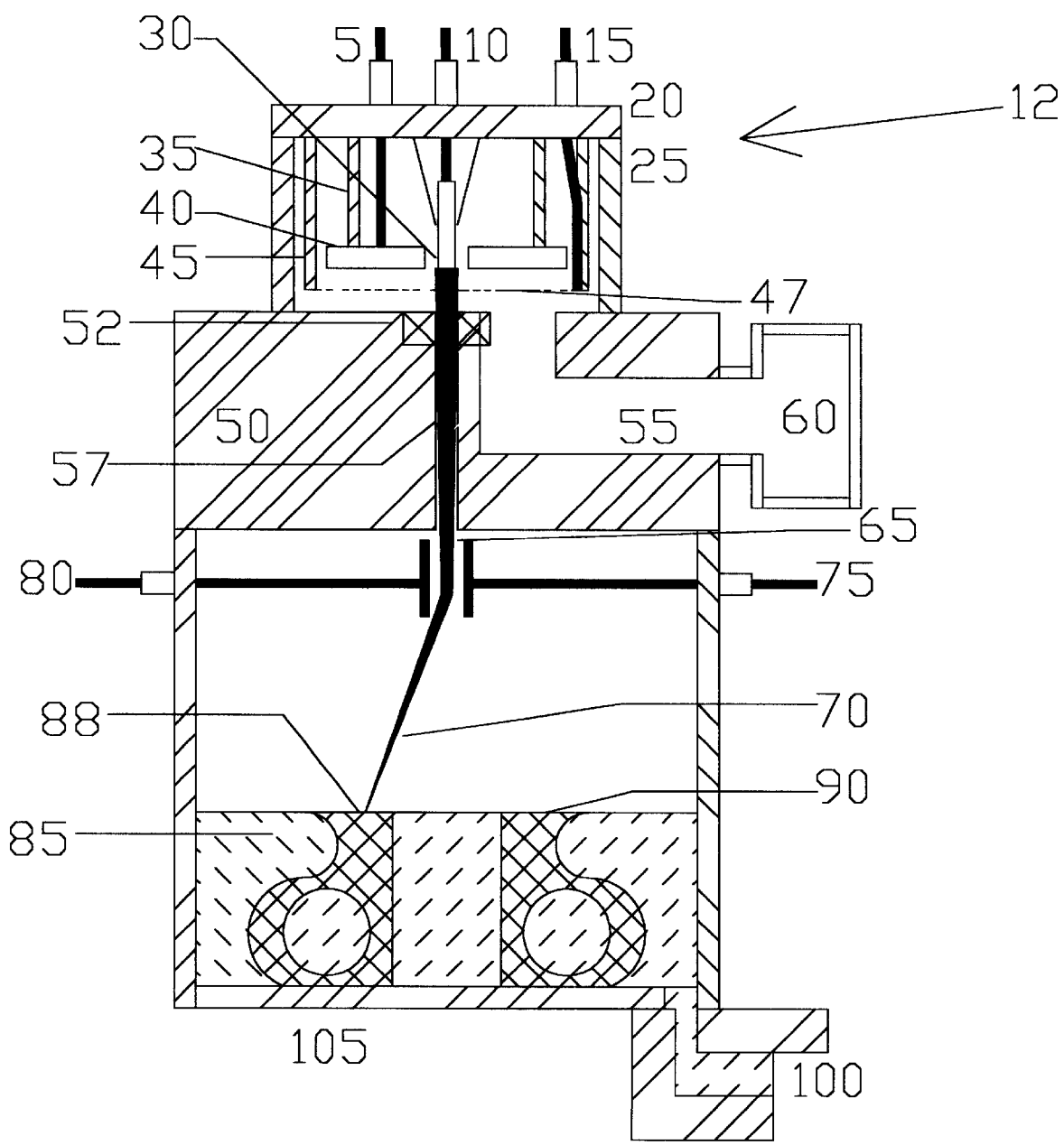
FIG. 1 shows a cross-section of the mechanical design including the beam path.

DESCRIPTION OF THE PREFERRED EMBODIMENTS (BEST MODES FOR CARRYING OUT THE INVENTION)

The use of an electron beam system for the fabrication process is superior to lasers and other existing rapid prototyping processes. In this process, the material in the rapid prototyping system is built up from liquid by using an electron beam to cure (i.e. instantaneously solidify through initiation of chemical reactions which lengthen polymer chains) a liquid.

The specific energy required to cure material is well established in the literature as approximately 5 Megarads (50 J/g). Ideally, a 200 W beam (100 kV, 2 mA) can solidify 4 g/sec, or about 4 cc/sec excluding voids. With a void fraction of 50% this volume rises to 8 cc/sec, and higher powers than 50 J/sec are possible. At this rate, a medium sized, complex assembly which is half solid (say, 6"×6"× 12") can be built up in 10 minutes. This is a factor of about 40 times faster than existing technology. The electron beam cure does not require photo initiators which a laser requires, therefore plastics with superior properties can be used.

The beam is controlled by an electric or magnetic steering system. Such a system can accurately position an electron beam on a target. It is not limited by mirror inertia as is a laser. The limitations in speed of processing are ultimately in the speed at which the deflection can be programmed in position, and turned on and off. Given the 10s of MHZ capabilities of various new technologies, cure rates of 50 cc/sec are possible if beams with enough accuracy are utilized. A grid can be used to turn the beam on and off to assure precision of radiation placement. The beam is arranged to "dwell" on a given spot for a time long enough to provide a dose high enough to cure the liquid so that those parts of the liquid surface irradiated are solidified. The beam is moved rapidly to all parts of the liquid in which solid material is required. This motion is a combination of turning off the beam with the grid, and placing it only in the region where solids are required. The liquid is added steadily, as the liquid is added, the beam is scanned to produce additional layers of appropriate shape. The beam strikes the portions of the part which will be solid and those portions are therefore cured.

The challenges inherent in creating this technology have already been overcome in such technologies as scanning electron microscopy, and cathode ray tube displays (i.e., televisions). These challenges are: Focusing the beam adequately to create fine features; Steering the beam accurately to control the shapes accurately; Creating appropriate vacuum conditions, avoiding or managing shrinkage, bubbling, and viscosity effects.

The present invention consists of an electron gun 12 which itself consists of shroud feedthrough 5, filament feedthrough 10, grid feedthrough 15, base plate 20, high voltage insulator 25, cathode 30, shroud insulator 35, shroud 40, and holder/insulator 45. The purpose of this electron gun 12 is to create an electron beam with low transverse energy which can be directed towards the curing region. Electron gun 12 is used to cure the monomer in the appropriate locations.

Electron gun 12 consists of a cathode 30 heated by a filament or directly through a filament by the power through the filament feedthrough 10 and the base plate 20. The beam is controlled by the voltage between grid 47 and base plate 20. The grid voltage is insulated by the holder/insulator 45 and the grid voltage is supplied through grid feedthrough 15. Additional elements of the focusing system may include shroud 40, shroud feedthrough 5 and focusing lens 52. The main accelerating voltage is insulated from the base plate potential 20 by the shroud insulator 35. This voltage may be fixed, in order to create a layer of fixed thickness, or variable, in order to create layers of varying depth.

Electron gun 12 is designed to create a beam with minimal emittance where emittance is the standard measure of the product of diameter and velocity. Once a beam is created, it's emittance cannot be reduced. The arrangement of potentials and geometry in the gun region is critical to creating a low emittance beam. Shroud 40 is arranged to have a potential which minimizes transverse fields in order to create a beam with low aberrations. The location of grid 47 is also critical, and in general is designed to reduce the emittance contribution of the grid by using a very fine grid. In an alternative embodiment, the grid can be eliminated in order to reduce emittance due to the grid. The emittance which can be achieved is determined by the thermal transverse energy of approximately 0.2 electron volts. If a diameter source of 0.1 mm diameter source is utilized, and a distance from final focus to the cured liquid of 40 cm, the achievable spot size at 100 kV is 0.12 mm, or 5 milli-inches in the English system of units.

Beam 70 travels from gun cathode 30 to the part being cured 90. In this path, adjustable focusing is provided by lens 52 which may be a magnetic lens as shown, or an electric lens such as an Einzel Lens. The critically important step is placing the electron beam at the right spot for curing the liquid.

At the spot where the beam hits the liquid 88 the beam size can be small, in order to produce the finest features, or larger in order to produce the fastest curing rates. The monomer or Oligomer to be cured 85 enters the system through port 100. Only a single port is shown, but multiple ports can be used for the liquid to enter to avoid vibration of the surface which will cause imperfections.

Deflection plates 80 and 75 along with deflection plates transverse to 80 and 75 (not shown) aim the beam towards the appropriate spot on the liquid surface 88. The deflection system must also take into account the exact relationship between voltage on the deflection plates 75 and 80, and the actual value of the deflection produced. This function clearly changes with the position of the liquid surface in the chamber.

The equation governing the deflection y for a pair of electrostatic plates is well known to be:

$$y=(VI)z/(2Ud)$$

where V is the voltage of the deflection plates, U is the energy of the electron beam, d is the spacing between the plates in cm, I is the length of the deflection plate in cm, and z is the distance from the plates to the cured spot. For example, one can create y=6.5 cm if V=6 kV, z=30 cm, I=5 cm, d=0.75 cm, and U=100 kV.

The vacuum level desirable in the gun region is $<10^{-5}$ Torr while the vacuum level around the cured material is $10^{-3}$ Torr due to the typical vapor pressure of the monomer as delivered by the manufacturer. This difference in vacuum level is maintained by the use of a large pumping channel 55 and by the use of small diameter transport tube 57. This differential pumping technique is advantageous in many cases, but may not be necessary for all monomers used.

The present invention intrinsically requires vacuum, unlike the inventions of Hull and others which suggest that electron beam processing can occur with precision in vacuum. If the beam were in air, at 100 keV the typical scattering of the beam would be 10 degrees in an inch thickness of atmospheric pressure air. This divergence would lead to a completely unacceptable beam size of almost 0.2 inches for a travel distance of 1 inch. Direct use of the electron beam in vacuum is practical, as embodied by this invention, since the beam source can be maintained at requisite pressures below $10^{-2}$ Torr.

Figure 2:
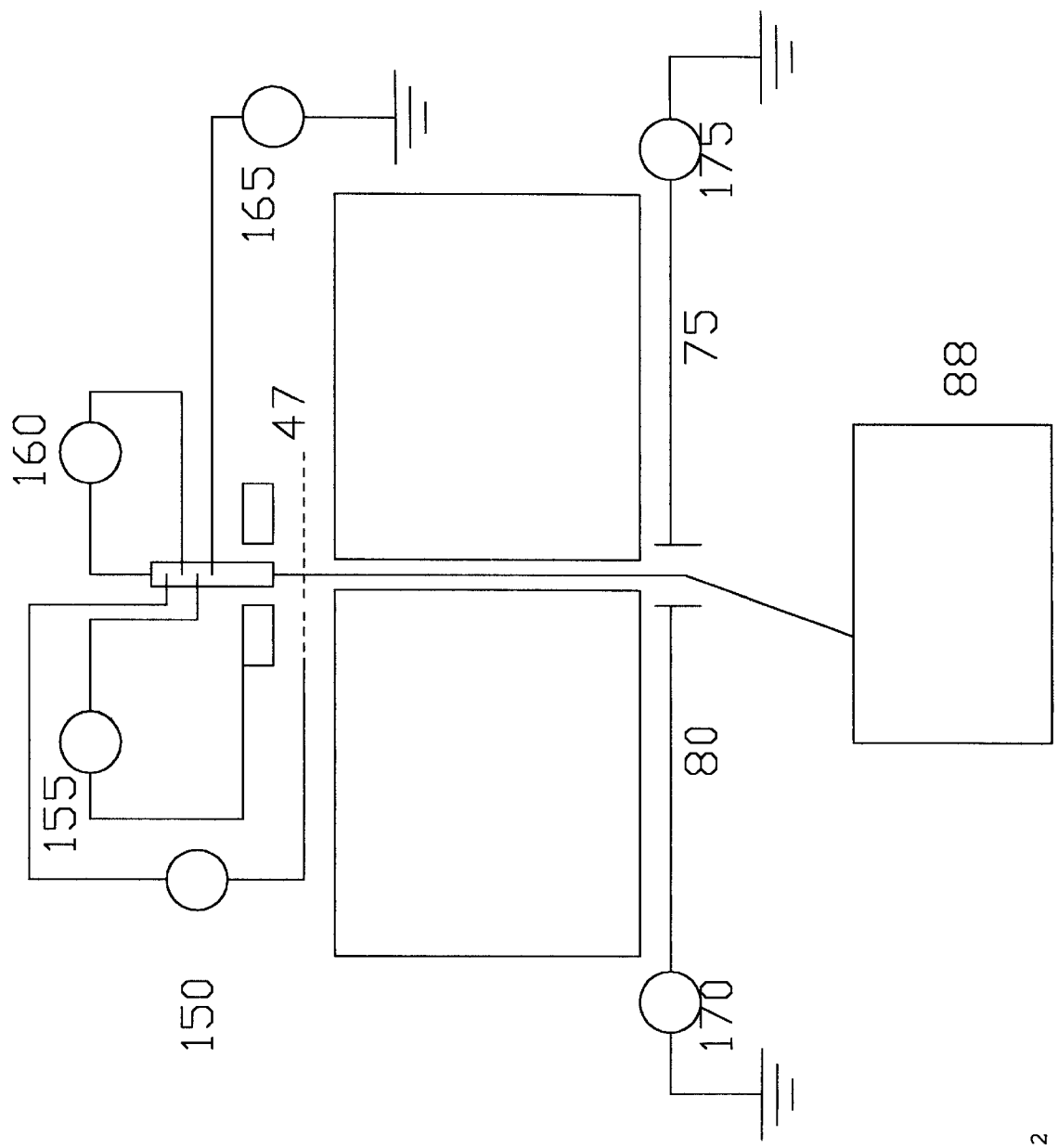
FIG. 2 shows the circuit schematic. Note that the transverse deflection plates (into the page) aren't shown. The x direction deflection plates are shown, and not the y direction (transverse) deflection plates. Both plates are required, of course, to create the arbitrary shapes required.

FIG. 2 shows the electrical requirements of a typical system including a grid power supply 150, a Shroud power supply 155, a filament power supply 160, a main high voltage power supply 165, and deflections power supplies 170 and 175. The high voltage power supply 165 may require the capability to vary it's voltage quickly. The deflection power supplies 170 and 175 must be amplifiers. Grid power supply 150 may be an amplifier to control current, or an on/off to control whether or not the current is on.

Figure 3:
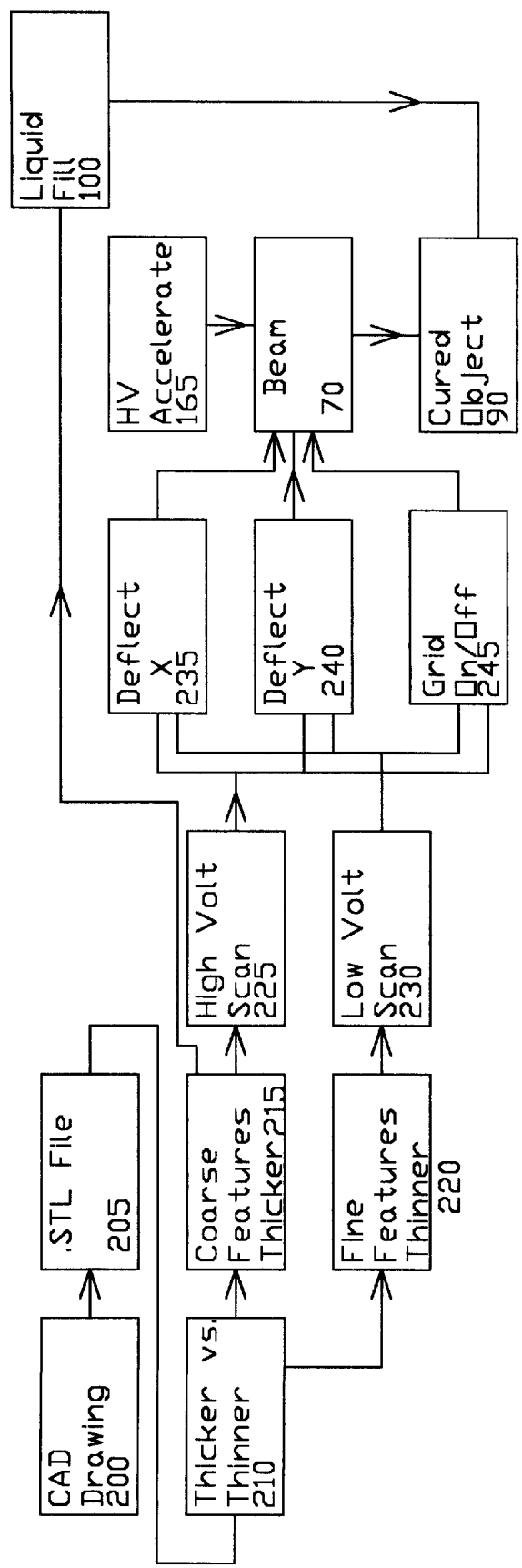
FIG. 3 is a flow chart showing the preferred process of fabricating an object.

The process of creating the part begins, as shown in FIG. 3, with the initial drawing 200 by the designer. This drawing, which may come from Pro/Engineer, Unigraphics, Solidworks, or other software with 3D modeling capability, is converted to a standard .STL format file 205. This file has information on the 2-dimensional solid portion of the 3 dimensional part.

This file is analyzed by computer to determine regions where fast curing is possible with a thicker, higher energy electron beam. This process is the thicker vs. thinner 210 selection process. The file is then analyzed to find regions where the lower energy, lower resolution beam can be used in the layer. The typical thicknesses cured at 50 kV, 100 kV, and 200 kV are 25 micrometers, 75 micrometers, and 250 micrometers. The bulk of any object will be "coarse" regions 215 in which the resolution required is 500 micrometers (0.5 mm) or larger. Each layer consists of a fine resolution pass 220 to define small, accurate features. Some layers have a fine pass (perhaps at 100 kV, 75 micrometer depth, and 150 micrometer transverse resolution) and a coarse pass (perhaps at 200 kV, 250 micrometer depth, and 500 micrometer resolution). By the use of multiple beam voltages, for example >75 KV high voltage 225, and <75 KV low voltage 230 it is possible to cure the monomer very rapidly.

A second file like the .STL file will be created by the software which has the values X deflection drive voltage 235, y deflection drive voltage 240, energy, flow rate, and grid pulse condition 245 for each time. The drive voltages will take into account the conversion from drive voltage to plate voltage and the spatial deflection which results for a given deflection drive voltage. These will be converted using "look-up" tables compiled during the testing of the machine.

The system used to create the cured layer consists of the electron source, electron acceleration 165, electron deflection system 235, 240, 75, and 80, and a fluid entry system 100. The electron source consists of an electron beam 70 with a tungsten ribbon filament which confines the electron beam 70 well, electrodes to produce a fine focus, and a grid control. The grid control circuit is a standard part such as is used to control vacuum tubes. Electron acceleration is provided by a power supply such as is produced by Gasman High Voltage with an auxiliary tube voltage control, or of the type used in U.S. Pat. No. 5,124,658, entitled Nested High Voltage. The deflection is provided by high voltage amplifiers which are similar to the amplifiers used in deflection systems in ion implanters such as those manufactured by Varian Semiconductor Equipment company.

Liquid fills the curing region gently from the bottom. The liquid will be held in an adjacent portion of the vacuum chamber before it is flowed into the curing region. The reason for this step is to allow any impurities to boil away. The monomer will be of a type similar to those manufactured by Ciba Chemical or DSM Somos for stereolithography applications. They will differ from stereolithographic monomers because photoinitiators are not required. The rate of liquid flow will be controlled by a standard flow control valve. The rate of flow will be determined by the same software that analyzes the .STL layers. The rate of flow will be (for example) 3 cc/second leading to a rise in a typical cross section of 200 cm$^2$ of 0.15 mm/second.

When curing and liquid addition is complete, the part will be mechanically moved into a "load lock" which simplifies vacuum handling, and it will be ready for use. For a 1 liter sized part with 20% cured area, this process can easily be accomplished in 5 minutes or less. At a system cost of $100/hour including operator and overheads, the part cost will be $5.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A rapid prototyping apparatus for solidifying a substance for fabricating three dimensional objects, the apparatus comprising:

at least one electron beam;

a means to focus said at least one electron beam;

a means to electromagnetically steer said focused at least one electron beam onto said substance to be solidified;

a control means to control said at least one electron beam wherein said electron beam comprises variable voltages for variable cure thicknesses of said substance to be solidified and to control said means to electromagnetically steer said focused at least one electron beam during a curing operation; and a vacuum chamber for said substance to be solidified.

2. The invention of claim 1 wherein said at least one electron beam comprises a continuous electron beam.

3. The invention of claim 1 wherein said at least one electron beam comprises a pulsed electron beam.

4. The invention of claim 1 wherein said means to focus said at least one electron beam comprises an adjustable focus lens.

5. The invention of claim 1 wherein said means to electromagnetically steer said focused at least one electron beam onto said substance to be solidified comprises an electric deflection apparatus.

6. The invention of claim 5 wherein said electric deflection apparatus comprises at least one deflection plate.

7. The invention of claim 1 wherein said means to electromagnetically steer said focused at least one electron beam onto said substance to be solidified comprises a magnetic deflection apparatus.

8. The invention of claim 7 wherein said magnetic deflection apparatus comprises at least one field coil.

9. The invention of claim 1 wherein said means to control said at least one electron beam comprises a computer and said means to electromagnetically steer said focused at least one electron beam control comprises said computer.

10. The invention of claim 1 wherein said substance to be solidified is introduced from a bottom of said vacuum chamber.

11. The invention of claim 1 wherein said vacuum chamber comprises differential pumping to maintain a low vacuum in an electron gun when said substance to be solidified has a high vapor pressure.

12. The invention of claim 1 further comprising a load lock apparatus for increasing the speed at which parts may be introduced into said rapid prototyping apparatus.

13. The invention of claim 1 wherein said variable voltages comprise a range between 50 kV to 200 kV.

\* \* \* \* \*